US011183758B2

(12) United States Patent
Pond et al.

(10) Patent No.: US 11,183,758 B2
(45) Date of Patent: *Nov. 23, 2021

(54) SYSTEM AND METHOD FOR ACTIVE ELECTRONICALLY SCANNED ARRAY WITH MULTI-BAND MULTI-BEAM ARCHITECTURE

(71) Applicant: Rockwell Collins, Inc., Cedar Rapids, IA (US)

(72) Inventors: Robert D. Pond, Cedar Rapids, IA (US); Lee M. Paulsen, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/520,027

(22) Filed: Jul. 23, 2019

(65) Prior Publication Data

US 2021/0265729 A1    Aug. 26, 2021

(51) Int. Cl.
*H04B 7/185* (2006.01)
*H01Q 5/30* (2015.01)
*H01Q 3/24* (2006.01)

(52) U.S. Cl.
CPC ............ *H01Q 5/30* (2015.01); *H01Q 3/24* (2013.01); *H04B 7/18515* (2013.01)

(58) Field of Classification Search
CPC .. H04B 7/0617; H04B 7/0408; H04B 7/0682; H04B 7/086; H04B 1/0483; H04B 7/0413; H01Q 21/065; H01Q 1/2283; H01Q 1/38; H01Q 21/0025
See application file for complete search history.

(56) References Cited

U.S. PATENT DOCUMENTS

| | | | |
|---|---|---|---|
| 6,895,258 B1* | 5/2005 | Scherzer | H04B 7/0617 370/334 |
| 9,735,469 B1 | 8/2017 | West et al. | |
| 10,200,098 B2 | 2/2019 | McMorrow et al. | |
| 2009/0009392 A1 | 1/2009 | Jacomb-Hood et al. | |
| 2010/0026574 A1 | 2/2010 | Pozgay | |

(Continued)

OTHER PUBLICATIONS

Extended European Search Report dated Dec. 17, 2020 for European Application No. 20187471.6.

*Primary Examiner* — Philip Sobutka
(74) *Attorney, Agent, or Firm* — Suiter Swantz pc llo (57) ABSTRACT

An active electrically scanned array (AESA) antenna device is disclosed. In embodiments, the AESA antenna device includes a beam forming network including a plurality of analog beamformer (ABF) integrated circuit devices. The beam forming network may be configured to: receive a first set of signals and a second set of signals with multiple ABF integrated circuit devices, and combine the first set of signals and the second set of signals to generate a first receive input beam and a second receive input beam. In embodiments, the AESA antenna device further includes a carrier substrate communicatively coupled to the beam forming network. The carrier substrate may be configured to receive the first receive output beam with a first electrical line and the second receive output beam with a second electrical line, and route the first electrical line and the second electrical line within a first manifold layer of the carrier substrate.

19 Claims, 6 Drawing Sheets

(56) References Cited

U.S. PATENT DOCUMENTS

| | | |
|---|---|---|
| 2013/0088391 A1 | 4/2013 | Corman et al. |
| 2014/0241239 A1* | 8/2014 | Chang ................ H04B 7/18504 370/316 |
| 2018/0175476 A1* | 6/2018 | Teshiba .............. H01Q 21/0025 |
| 2018/0316383 A1* | 11/2018 | Kamgaing ............... H04B 1/44 |
| 2019/0115658 A1* | 4/2019 | Iannotti ............. H01Q 21/0025 |

* cited by examiner

SYSTEM AND METHOD FOR ACTIVE ELECTRONICALLY SCANNED ARRAY WITH MULTI-BAND MULTI-BEAM ARCHITECTURE

BACKGROUND

Aircraft antennas including active electronically scanned arrays (AESAs) often utilize semiconductor and integrated circuit devices to carry out various functions, including receipt of radio frequency (RF) signals, control loops, phase shifting functions, and the like. Currently, traditional aircraft satellite communication (SATCOM) communication systems (e.g., aircraft AESA antennas) are configured to communicate with individual constellation systems. In this regard, an aircraft may require separate SATCOM communication systems (e.g., separate AESA antennas) to communicate with both the Ku-band and the Ka-band constellations. For example, ViaSat, Gilat, and SkyTech communication systems each include separate Ku-band and Ka-band antennas which are configured to support individual constellation connectivity, and are incompatible with multi-beam applications. Additionally, requiring multiple SATCOM communication systems on a single aircraft is cost prohibitive, unnecessarily increases the total weight of the aircraft, and requires double the electrical power.

Additionally, traditional aircraft SATCOM communication systems utilize manifolds of passive combiners/splitters for signal/beam routing, which are physically large and bulky to incorporate into the aircraft. Furthermore, each beam of an AESA antenna device must be routed in a separate manifold layer of a printed circuit board (PCB). In this regard, receiving/routing multiple signals/beams requires additional layers of PCB, which becomes functionally and structurally impracticable beyond two beams.

Therefore, there exists a need in the art for a system and method which cure one or more of the shortfalls of previous approaches identified above.

SUMMARY

An active electrically scanned array (AESA) antenna device is disclosed. In embodiments, the AESA antenna device includes a beam forming network including a plurality of analog beamformer (ABF) integrated circuit devices. The beam forming network may be configured to: receive a first set of signals and a second set of signals with a first ABF integrated circuit device; receive the first set of signals and the second set of signals with a second ABF integrated circuit device; combine, with the second ABF integrated circuit device, the first set of signals received by the first ABF integrated circuit device and the first set of signals received by the second ABF integrated circuit device to generate a first receive input beam; and combine, with the second ABF integrated circuit device, the second set of signals received by the first ABF integrated circuit device and the second set of signals received by the second ABF integrated circuit device to generate a second receive input beam. In embodiments, the AESA antenna device further includes a carrier substrate communicatively coupled to the beam forming network. The carrier substrate may be configured to: receive the first receive output beam with a first electrical line; receive the second receive output beam with a second electrical line; and route the first electrical line and the second electrical line within a first manifold layer of the carrier substrate.

A method of routing signals in an active electronically scanned array (AESA) device is disclosed. In embodiments, the method may include: receiving a first set of signals and a second set of signals with a first ABF integrated circuit device of a beam forming network; receiving the first set of signals and the second set of signals with a second ABF integrated circuit device of the beamforming network; combining the first set of signals received by the first ABF integrated circuit device and the first set of signals received by the second ABF integrated circuit device to generate a first receive input beam; combining the second set of signals received by the first ABF integrated circuit device and the second set of signals received by the second ABF integrated circuit device to generate a second receive input beam; transmitting the first receive input beam and the second receive input beam to a carrier substrate; and routing the first receive input beam and the second receive input beam within a single layer of the carrier substrate.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are provided for example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of sub-combination of two or more such features, along with any other features which may not necessarily be expressly described or inherently present in the instant disclosure.

Currently, traditional aircraft satellite communication (SATCOM) communication systems (e.g., aircraft AESA antennas) are configured to communicate with individual constellation systems, and are unable to support multi-beam applications. In this regard, multiple AESA antennas are required on a single aircraft in order to simultaneously communicate on multiple constellations, which may be cost prohibitive and unnecessarily increase the total weight of the aircraft.

Additionally, traditional aircraft SATCOM communication systems utilize manifolds of passive combiners/splitters for signal/beam routing, which are physically large and bulky to incorporate into the aircraft. Furthermore, each beam of an AESA antenna device must be routed in a separate manifold layer of a printed circuit board (PCB). In this regard, receiving/routing multiple signals/beams requires additional layers of PCB, which becomes functionally and structurally impracticable beyond two beams.

Accordingly, embodiments of the present disclosure are directed to a system and method which cure one or more of the shortfalls of the previous approaches identified above. Embodiments of the present disclosure are directed to an AESA antenna device configured to perform beamforming and combining/splitting within a single beam forming network of a multi-chip module. Additional embodiments of the present disclosure are directed to an AESA antenna device configured to route multiple beams through a single manifold layer. Further embodiments of the present disclosure are directed to a method of operating an AESA antenna device by performing beamforming and signal routing within a single beam forming network and routing multiple beams through a single manifold layer of a carrier substrate.

It is contemplated herein that embodiments of the present disclosure may provide for lighter, more compact AESA antenna devices configured to allow for multi-beam connectivity. In particular, by routing multiple beams in a single manifold layer, embodiments of the present disclosure may enable carrier substrates with fewer layers and simplified routing paths. By utilizing active combining and splitting, the AESA antenna device of the present disclosure may be configured to support multiple beams on the same chip without cross-contaminating signals.

Figure 1:
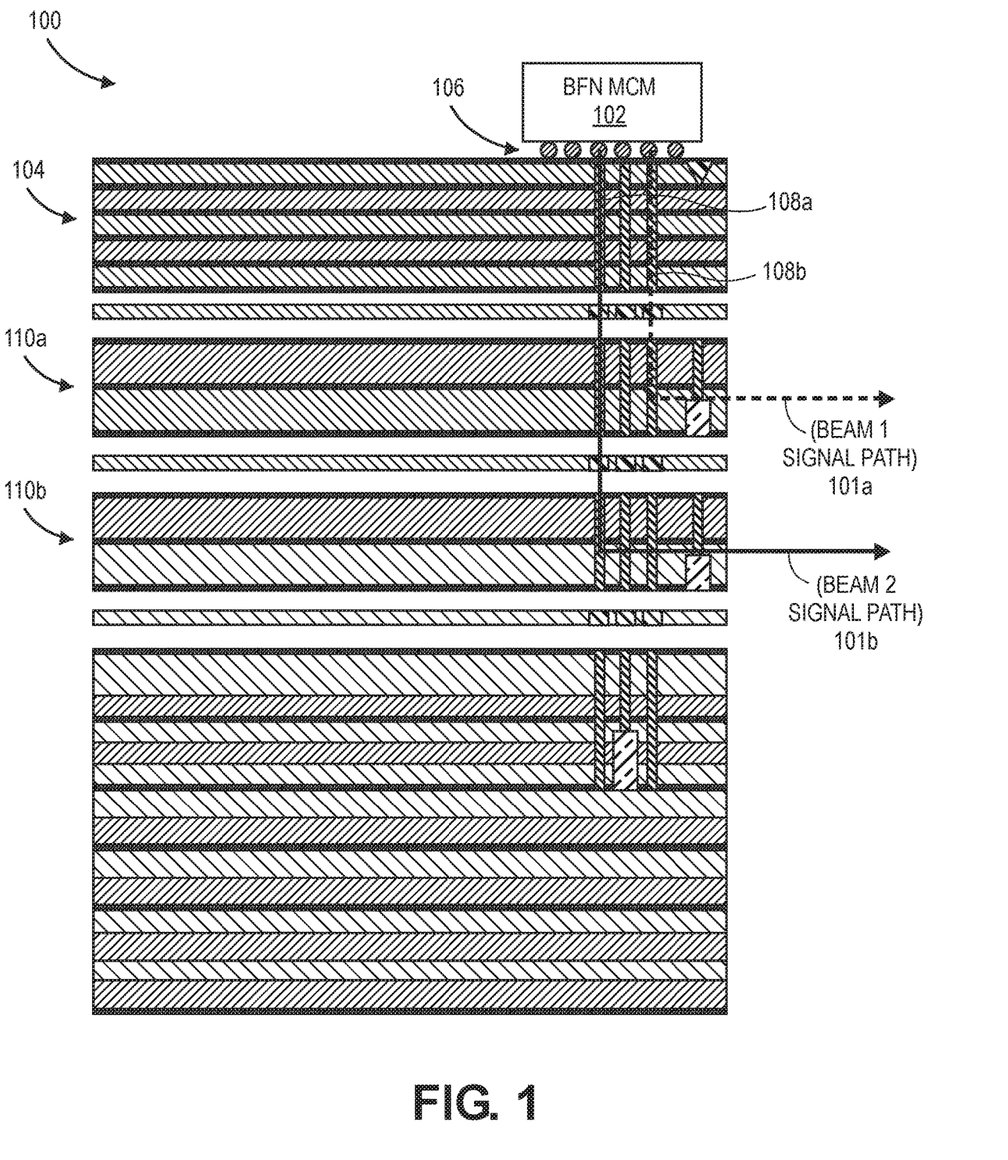
FIG. 1 illustrates an active electronically scanned array (AESA) antenna device.

FIG. 1 illustrates an active electronically scanned array (AESA) antenna device 100. In particular, the AESA antenna device 100 depicted in FIG. 1 is shown as an example AESA antenna device according to previous SATCOM communication systems. It is contemplated herein that a brief description of the AESA device 100 in FIGS. 1-2 may provide a reference point against which attendant advantages of the present disclosure may be compared.

The AESA antenna device 100 may include a beamforming network (BFN) disposed on a multi-chip module (MCM) (e.g., MCM 102). The MCM 102 may be communicatively coupled to a carrier substrate 104 via one or more conductive couplings 106. In traditional AESA devices (e.g., AESA antenna device 100), the processes of beamforming and signal routing must be carried out separately and independently. For example, in the AESA antenna device 100, beamforming functions are carried out in the MCM 102, and beam/signal routing functions are carried out within the carrier substrate 104.

For example, the MCM 102 of the AESA antenna device 100 may include one or more integrated circuits communicatively coupled to antenna terminal elements of the AESA device 100. In this regard, the one or more integrated circuits of the MCM 102 are configured to receive signals from transmitting devices and carry out beamforming functions within the MCM 102. Continuing with the same example, the combined beams generated by the MCM 102 are transmitted to the carrier substrate 104 via electrical lines 108a, 108b along beam signal paths (e.g., beam 1 signal path 101a, beam 2 signal path 101b).

With traditional SATCOM communication systems, each set of signals received from a particular transmitting device must be routed through an independent manifold layer 110a, 110b of the carrier substrate 104. For example, as shown in FIG. 1, a first set of signals received from a first transmitting device (e.g., Ku-band satellite) must be routed along a beam 1 signal path 101a through a first manifold layer 110a of the carrier substrate 104. By way of another example, a second set of signals received from a second transmitting device (e.g., Ka-band satellite) must be routed along a beam 2 signal path 101b through a second manifold layer 110b of the carrier substrate 104.

Requiring separate signals (e.g., beams) to be routed through separate manifold layers 110a, 110b of the carrier substrate 104 poses many practical limitations and drawbacks. First, by routing each beam through a separate manifold layer 110a, 110b, the carrier substrates 104 required to route multiple beams become increasingly large, complex, and costly to manufacture. Secondly, in order to adapt/modify an existing AESA antenna device 100 to receive and route additional beams, additional manifold layers must be fabricated within the carrier substrate 104, which may be cost prohibitive, impracticable, or even impossible.

Practical limitations associated with manifold layers 110a, 110b pose additional drawbacks to the AESA antenna device 100. The manifold layers 110a, 110b of the AESA antenna device 100 may be further shown and described with reference to FIG. 2.

Figure 2:
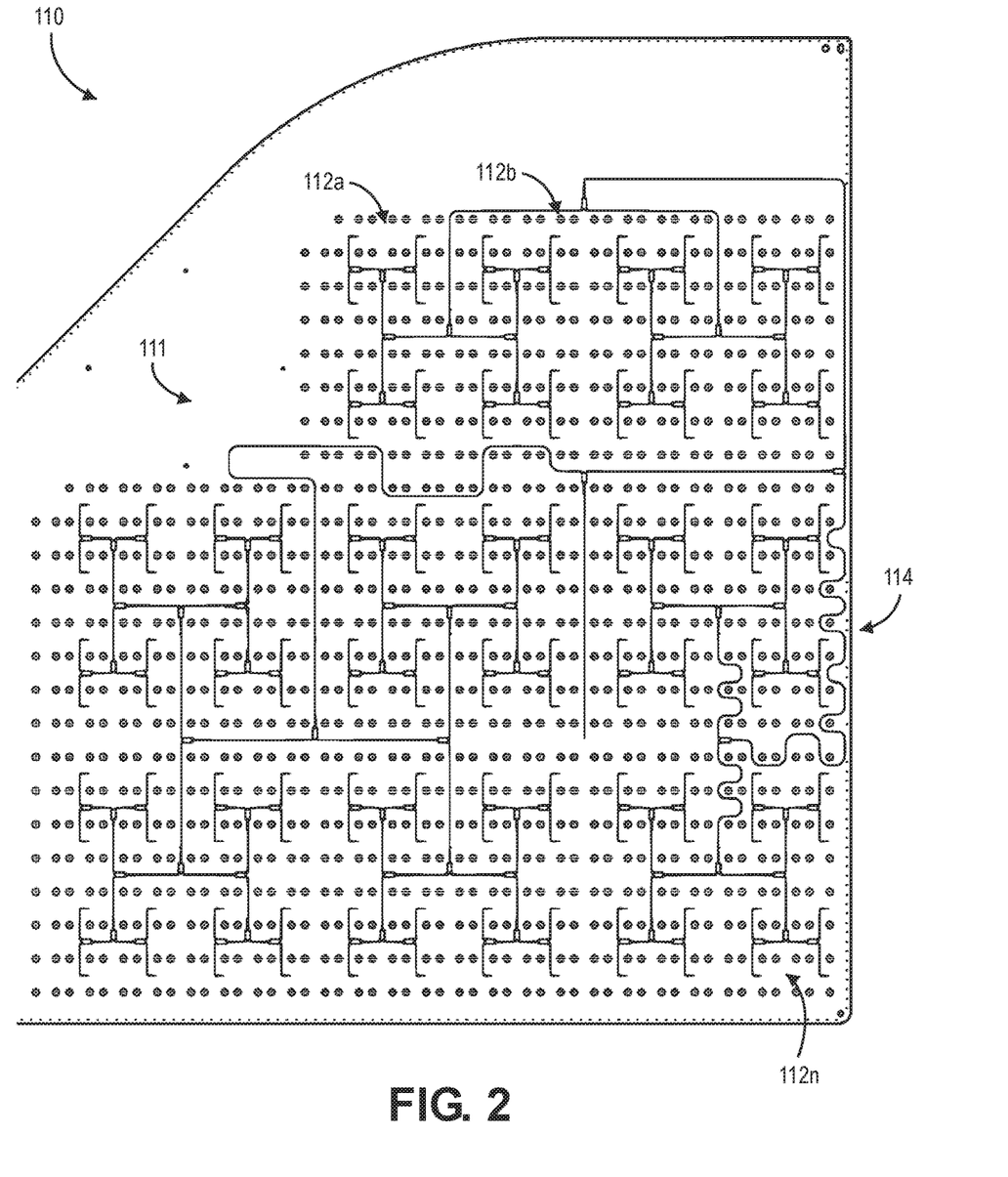
FIG. 2 illustrates a manifold layer of a carrier substrate of an AESA antenna device.

FIG. 2 illustrates a manifold layer 110 of a carrier substrate 104 of an AESA antenna device 100.

The manifold layer 110 illustrates electrical circuitry (e.g., electrical lines 111) configured to route a single beam of the AESA antenna device 100 from the MCM 102 to various other components of a SATCOM communication system, and vis versa. For example, the manifold layer 110 illustrated in FIG. 2 may illustrate the manifold layer 110a depicted in FIG. 1 and configured to route a first set of signals along the beam 1 signal path 101a. As shown in FIG. 2, the manifold layer 110 may include a plurality of branching structures 112a-112n including a series of 2:1 combiners/splitters (e.g., Wilkinson combiners/splitters). In this regard, the manifold layer 110 of the AESA antenna device 100 carries out beamforming and routing with passive splitters/combiners.

In order to carry out signal routing within a passive beamforming manifold (e.g., manifold layer 110), the electrical lines 111 between each layer of the branching manifold structure must be equivalent. This may be referred to as "length matching." With increasingly complex branching manifold structures, electrical lines 111 may have to be routed into complex patterns in order to achieve proper length matching between the various layers of the branching manifold structure. For example, as shown in FIG. 2, the electrical lines 111 may be routed along length-matching segments 114 in order to achieve proper length-matching within the manifold layer 110. The increasingly complex layout and long electrical lines 111 of the manifold layer 110 complicate the signal routing process, and prevent multiple beams form being able to be routed in the same manifold layer 110. Additionally, the complex branching manifold requires more costly carrier substrate 104 fabrication, and leads to long electrical lines 111 which increase loss and decrease the signal to noise (SNR) ratio throughout the AESA antenna device 100.

Furthermore, the layout and length-matching segments 114 of each respective manifold layer 110 is tailored to a pre-defined frequency. Thus, each manifold layer 110 may be designated to receive and transmit beams of the pre-defined frequency. In order to accommodate beams of varying or different frequencies, the layout of the manifold layer 110 may have to be changed. Accordingly, the manifold layers 110 of traditional AESA devices 100 may be tailored to narrowband applications, but may be incompatible with broadband applications.

Finally, as noted previously herein, each set of signals received from a particular transmitting device must be routed through an independent manifold layer 110a, 110b of the carrier substrate 104. In this regard, the complex, branching manifold structure illustrated in FIG. 2 must be repeated in separate manifold layers 110a, 110b of a carrier substrate 104 for each beam to be transmitted and/or received.

Accordingly, embodiments of the present disclosure are directed to a system and method configured to perform beamforming and combining/splitting within a single beam forming network of a multi-chip module. Additional embodiments of the present disclosure are directed to an AESA antenna device configured to route multiple beams through a single manifold layer. Further embodiments of the present disclosure are directed to a method of operating an AESA antenna device by performing beamforming and signal routing within a single beam forming network and routing multiple beams through a single manifold layer of a carrier substrate.

Figure 3:
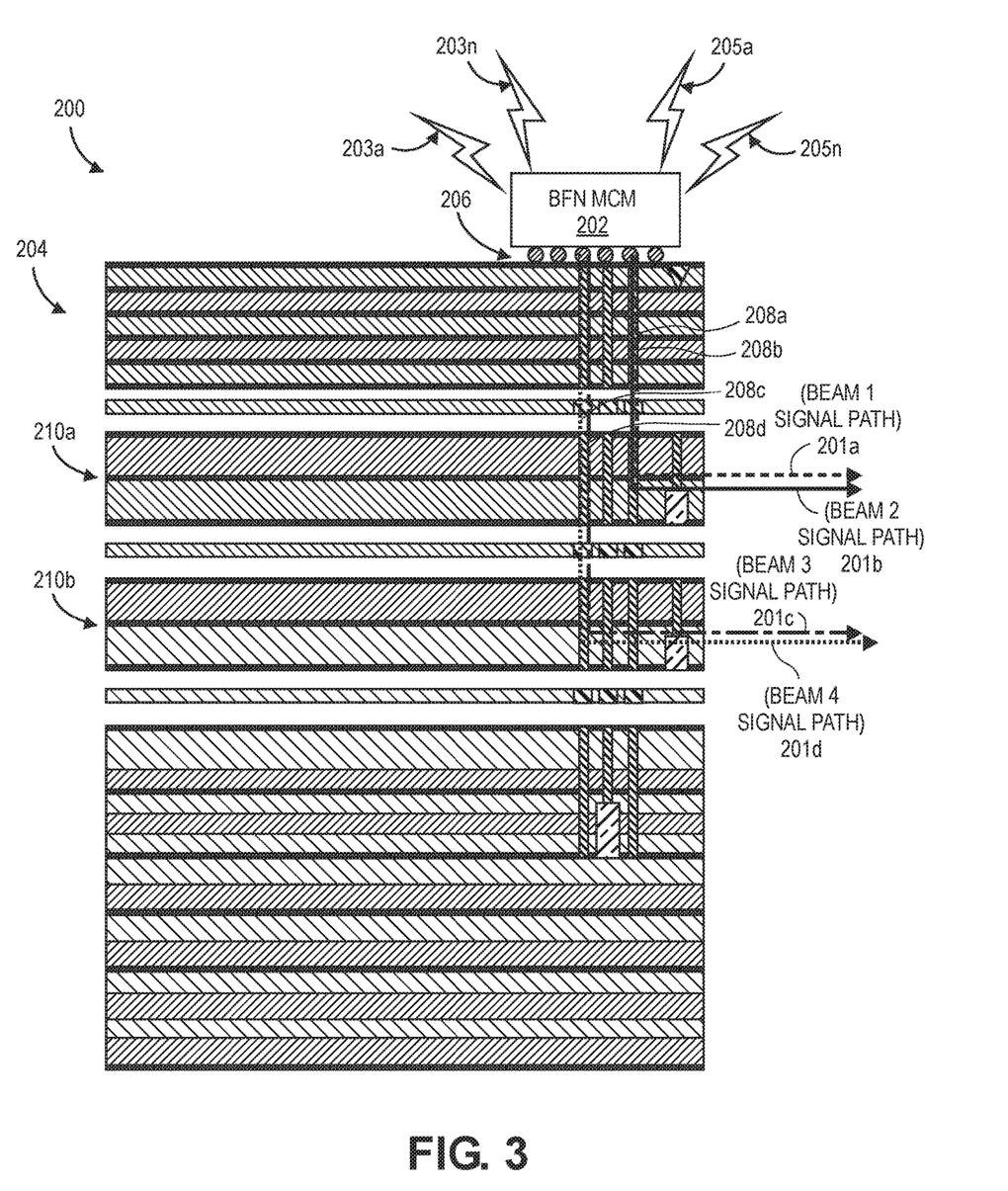
FIG. 3 illustrates an active electronically scanned array (AESA) antenna device, in accordance with one or more embodiments of the present disclosure.

FIG. 3 illustrates an active electronically scanned array (AESA) antenna device 200, in accordance with one or more embodiments of the present disclosure. The AESA antenna device 200 may include, but is not limited to, a beam forming network (BFN) disposed on a multi-chip module (MCM) 202 and a carrier substrate 204.

In embodiments, the MCM 202 may be configured to receive and/or transmit sets of signals from/to other devices. For example, MCM 202 of the AESA antenna device 200 may be configured to receive one or more sets of signals 203 from one or more transmitting devices. The AESA antenna device 200 may be configured to receive sets of signals 203 from any type of transmitting device known in the art including, but not limited to, Ku-band constellation satellites, Ka-band constellation satellites, low Earth orbit (LEO) satellites, geosynchronous equatorial orbit (GEO) satellites, OneWeb satellites, and the like. In embodiments, the AESA antenna device 200 may be configured to enable multi-beam connectivity to multiple communication networks and/or transmitting devices. For instance, the AESA antenna device 200 may be configured to receive a first set of signals 203a from a Ku-band satellite, and receive a second set of signals 203b from a Ka-band satellite. By way of another example, MCM 202 of the AESA antenna device 200 may be configured to transmit one or more sets of signals 205.

The MCM 202 may be communicatively coupled to the carrier substrate 204 via one or more conductive structures 206. The one or more conductive structures 206 may include any conductive structures known in the art for electrically coupling dies and integrated circuits to carrier substrates including, but not limited to, copper pillars, vias, pins, solder, and the like. Similarly, the carrier substrate 204 may include any carrier substrate known in the art including, but not limited to, a printed circuit board (PCB).

As will be described in further detail herein, the MCM 202 may be configured to generate one or more beams ("receive input beam") from the received sets of signals 203 and transmit the generated receive input beams to the carrier substrate 204 via one or more electrical lines 208. For example, the AESA antenna device 200 may receive four sets of signals 203a, 203b, 203c, 203d from four separate transmitting devices and generate four receive input beams (e.g., Beam 1, Beam 2, Beam 3, Beam 4). Continuing with the same example, the generated receive input beams may be transmitted to from the MCM 202 to the carrier substrate 204 via electrical lines 208, wherein the first receive input beam (Beam 1) is transmitted via a first electrical line 208a, the second receive input beam (Beam 2) is transmitted via a second electrical line 208b, the third receive input beam (Beam 3) is transmitted via a third electrical line 208c, and the fourth receive input beam (Beam 4) is transmitted via a fourth electrical line 208d.

In embodiments, the AESA antenna device 200 may be configured to route each generated receive input beam along a beam signal path 201 (e.g., Beam 1 signal path 201a, Beam 2 signal path 201b, Beam 3 signal path 201c, Beam 4 signal path 201d). In the context of aviation, the generated beams may be routed through the carrier substrate 204 to various components of an aircraft communication/guidance system including, but not limited to, a radar controller, a Global Navigation Satellite System (GNSS) controller, and the like.

In additional embodiments, the AESA antenna device 200 may enable multiple beams to be routed within the same manifold layer 210a, 210b of the carrier substrate 204. For example, the first receive input beam (Beam 1) and the second receive input beam (Beam 2) may be routed within a first manifold layer 210a along the Beam 1 signal path 201a and the Beam 2 signal path 201b, respectively. By way of another example, the third receive input beam (Beam 3) and the fourth receive input beam (Beam 4) may be routed within a second manifold layer 210b different from the first manifold layer 210a along the Beam 3 signal path 201c and the Beam 4 signal path 201d, respectively. By routing multiple beams within a single manifold layer 210a, 210b, the AESA antenna device 200 may provide for simpler, lighter, and more efficient carrier substrates 204.

Figure 4:
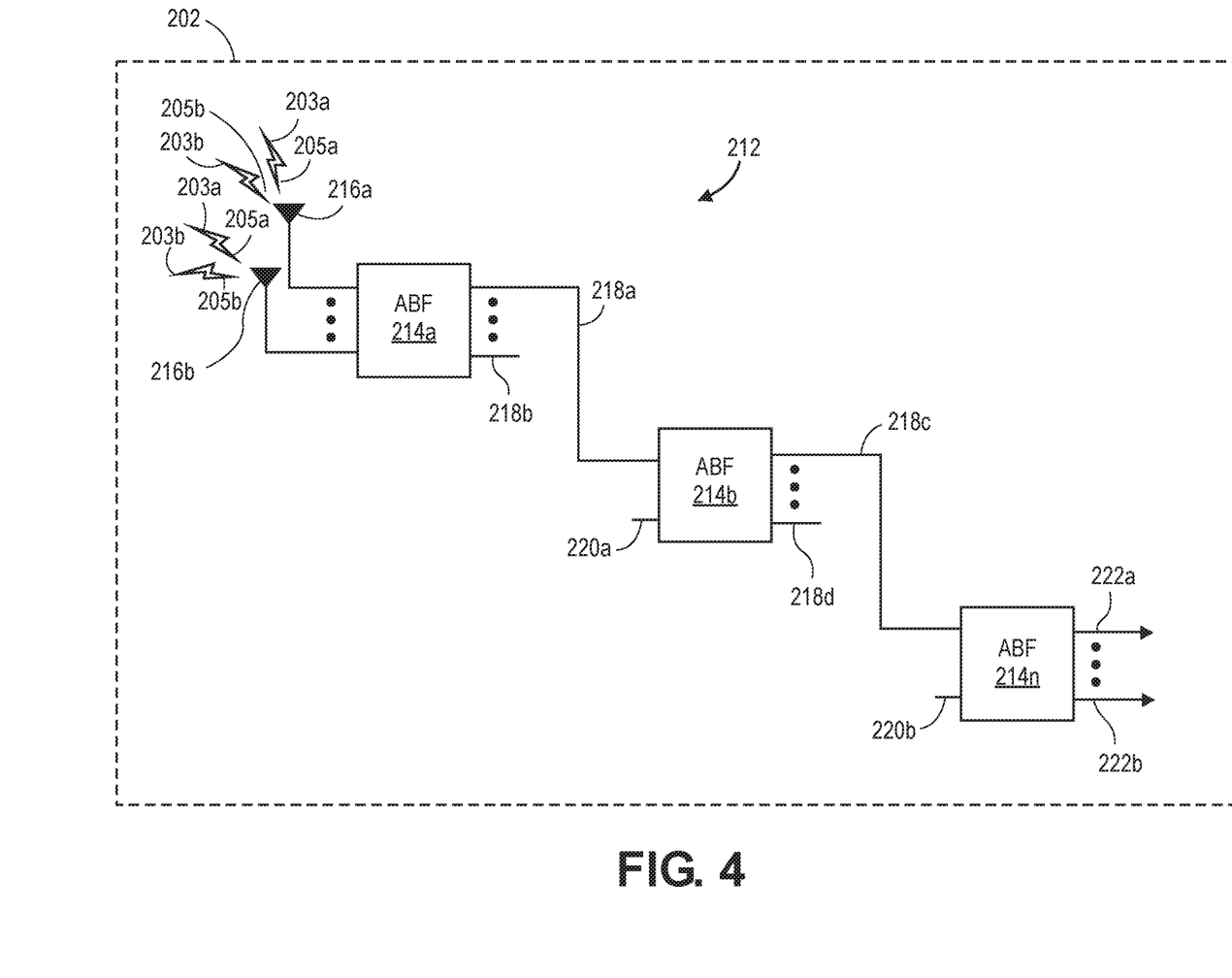
FIG. 4 illustrates a simplified block diagram of a beam forming network of an AESA antenna device, in accordance with one or more embodiments of the present disclosure.

FIG. 4 illustrates a simplified block diagram of a beam forming network (BFN 212) of an AESA antenna device 200, in accordance with one or more embodiments of the present disclosure. In particular, FIG. 4 illustrates a beam forming network (BFN 212) disposed on the multi-chip module (MCM 202) of the AESA antenna device 200 depicted in FIG. 3.

In embodiments, the BFN 212 includes a plurality of analog beamformer (ABF) integrated circuit devices 214a, 214b, 214n. The BFN 212 may include any number of ABF integrated circuit devices 214a-214n. Due to the small form factor of the ABF integrated circuit devices 214a-214n, it is contemplated herein that multiple ABF integrated circuit devices 214a-214n may be disposed on a single MCM 202. Furthermore, due to the fact that the ABF integrated circuit devices 214a-214n may be configured to carry out combining/splitting functions, physical space on the MCM 202 typically allocated for combining network die may be allocated to additional ABF integrated circuit devices 214a-214n.

In embodiments, the ABF integrated circuit devices 214a-214n include active splitters/combiners configured to provide for ultra-wideband combining and/or splitting. In this regard, ABF integrated circuit devices 214a-214n may each include one or more amplifiers, one or more phase shifters, and/or one or more time shifters configured to adjust one or more characteristics of signals received by the ABF integrated circuit devices 214a-214n. Signal characteristics which may be modified by the ABF integrated circuit devices 214a-214n may include, but are not limited to, signal amplitude, signal phase (e.g., phase shifts), signal timing (e.g., time delays), and the like. It is noted herein that length-matching within the BFN 212 may still be preferable. However, it is contemplated herein that amplifiers and/or phase shifters within the ABF integrated circuit devices 214a-214n may be used to induce phase shifts and/or time delays in order to correct for differences in non-length matched lines and compensate for routing path length differences. It may be appreciated that these corrections for non-length-matched lines are not possible using the passive splitting/combining techniques in traditional AESA antenna devices 100.

In embodiments, the active ABF integrated circuit devices 214 may allow for reception and/or transmission of much wider bandwidths than has been possible with the passive combiners/splitters of traditional AESA antenna devices (e.g., AESA antenna device 100). For example, AESA antenna device 100 utilizing passive combining/splitting may be configured to operate within a range of frequencies of approximately 10-12 GHz, whereas the AESA antenna device 200 utilizing active ABF integrated circuit devices 214a-214b may be configured to operate within a range of frequencies of approximately 10-20 GHz. In additional and/or alternative embodiments, signal routing paths (e.g., Beam 1 signal path 201a, Beam 2 signal path 201b, and the like) may be programmed/structured to be band-specific, as was noted with respect to the AESA antenna device 100.

In some embodiments, the plurality of ABF integrated circuit devices 214a-214n are configurable for multiple applications and system requirements, thereby reducing integrated circuit costs and design costs because the integrated circuit can be utilized on many different platforms and many different applications (e.g., in airborne radar applications, satcom applications, and electronic warfare sensors applications). In some embodiments, the plurality of ABF integrated circuit devices 214a-214n include configurable paths including amplifiers, splitters, combiners, variable gain amplifiers (VGAs), phase shifters, and time delays designed to receive sets of signals 203 or data via terminal antenna elements 216. The ABF integrated circuit devices 214a-214b are described in further detail in U.S. patent application Ser. No. 15/983,917, filed on Jun. 14, 2018, entitled CONFIGURALE BEAM FORMER INTEGRATED CIRCUIT AND METHOD, which is incorporated herein by reference in the entirety.

In embodiments, one or more ABF integrated circuit devices 214a-214n may be communicatively coupled to one or more antenna terminal elements 216a-216n. For example, the ABF integrated circuit device 214a may be communicatively coupled to a first antenna terminal element 216a and a second antenna terminal element 216b. The BFN 212 including a plurality of interconnected ABF integrated circuit devices 214a-214n may be configured to carry out active combining and/or splitting in order to receive sets of signals 203 and/or transmit sets of signals 205.

For example, a first ABF integrated circuit device 214a may be configured to receive a first set of signals 203a from a first transmitting device (e.g., first satellite), and a second set of signals 203b from a second transmitting device (e.g., second satellite) via the one or more antenna terminal elements 216a, 216b. The first ABF integrated circuit device 214a may then be configured to transmit an intermediate beam 218a to a second ABF integrated circuit device 214b, wherein the intermediate beam 218a includes the first set of signals 203a and the second set of signals 203b. The first ABF integrated circuit device 214a may also be configured to transmit the first set of signals 203a and the second set of signals 203b to an additional ABF integrated circuit device 214 via intermediate beam 218b.

Continuing with the same example, the second ABF integrated circuit device 214b may be configured to receive the intermediate beam 218a including the first set of signals 203a and the second set of signals 203b received by the first ABF integrated circuit device 214a. The second ABF integrated circuit device 220 may further be configured to receive one or more sets of signals via a port 220a. The port 220a may be communicatively coupled to one or more antenna terminal elements 216 and/or another ABF integrated circuit device 214. For example, in embodiments where the second ABF integrated circuit device 214b is communicatively coupled to one or more antenna terminal elements 216 (not shown) via port 220a, the second ABF integrated circuit device 214b may further be configured to receive the first set of signals 203a from the first transmitting device (e.g., first satellite), and the second set of signals 203b from the second transmitting device (e.g., second satellite) via the one or more antenna terminal elements 216 (not shown).

The second ABF integrated circuit device 214*b* may be configured to actively combine the first set of signals 203*a* and the second set of signals 203*b* received via the intermediate beam 218*a* and the port 220*a* to generate an intermediate beam 218*c* and an intermediate beam 218*d*. The second ABF integrated circuit device 214*b* may then be configured to transmit the intermediate beam 218*c* to an Nth ABF integrated circuit device 214*n*, and transmit the intermediate beam 218*d* to another ABF integrated circuit device 214 (not shown).

The second ABF integrated circuit device 214*b* may be configured to actively combine the first set of signals 203*a* and the second set of signals 203*b* received via the intermediate beam 218*a* and the port 220*a* to generate an intermediate beam 218*c* and an intermediate beam 218*d*. It is noted herein that any discussion associated with the second ABF integrated circuit device 214*b* and/or the port 220*a* may be regarded as applying to the Nth integrated circuit device 214*n*, unless noted otherwise herein.

In embodiments, the Nth ABF integrated circuit device 214*n* may be configured to generate a first receive input beam 222*a* (Beam 1) and a second receive input beam 222*b* (Beam 2). The first receive input beam 222*a* may include the first set of signals 203*a* received via each respective antenna terminal element 216*a*-216*n* and combined throughout the BFN 212. Similarly, the second receive input beam 222*b* may include the second set of signals 203*a* received via each respective antenna terminal element 216*a*-216*n* and combined throughout the BFN 212. In embodiments, the first receive input beam 222*a* and the second receive input beam 222*b* may be transmitted to the carrier substrate 204 via the first electrical line 208*a* and the second electrical line 208*b*, respectively.

It is noted herein that the interconnected, cascading configuration of the ABF integrated circuit devices 214*a*-214*n* of the BFN 212 may provide a number of advantages over prior approaches. For example, tunable linearity of the BFN 212 may allow for the same splitter/combiner (e.g., ABF integrated circuit device 214*a*-214*n*) to be used in multiple locations along the path of radio frequency (RF) signals (e.g., sets of signals 203, 205) routed through the BFN 212. Furthermore, it is contemplated herein that the interconnected branching structure of the BFN 212 may enable higher overall performance/efficiency of the BFN 212 even while using lower-performance splitters/combiners (e.g., ABF integrated circuit device 214*a*-214*n*).

The BFN 212 of the MCM 202 may include an interconnected branching manifold of active splitters/combiners (e.g., ABF integrated circuit devices 214*a*-214*n*) may be configured to receive any number of inputs and generate any number of outputs. For example, the ABR integrated circuit devices 214*a*-214*n* may include, but are not limited to, 2:1 active splitter/combiners, 4:1 active splitter/combiners, and the like. It is noted herein that the ability to provide multiple inputs and multiple outputs may allow multiple beams to be combined/split on the same chip without cross contaminating signals. Additionally, the use of active combiners may provide for simplified application of non-binary arrays, without adding design complexity or loss in performance, which is difficult to do with passive active combiners/splitters.

Finally, it is contemplated herein that the use of ABF integrated circuit devices 214*a*-214*n* as active combiners/splitters within the BFN 212 may enable improved stabilization of the RF routing performance, as well as simplified integration of gain along the routing paths. In particular, the use of active splitters/combiners may reduce the need for a high gain/low noise front end performing reception of signals, and may eliminate the need for input power to be provided to splitters during transmission processes.

While the BFN 212 shown in FIG. 2 has been described primarily in the context of combining sets of signals 203*a*, 203*b* to generate receive input beams 222*a*, 222*b*, this is not to be regarded as a limitation of the present disclosure, unless noted otherwise herein. In particular, it is contemplated herein the BFN 212 shown in FIG. 2 may be configured to receive and combine sets of signals 203*a*, 203*b*, as well as split and transmit sets of signals 205*a*, 205*b*. For example, the ABF integrated circuit device 214*n* may be configured to receive a first transmit output beam 224*a* and a second transmit output beam 224*b* from the carrier substrate 204. Each ABF integrated circuit device 214*a*-214*n* may then be configured to actively split the first transmit output beam 224*a* and the second transmit output beam 224*b*. The ABF integrated circuit devices 214*a*-214*n* may then be configured to transmit the first transmit output beam 224*a* and the second transmit output beam 224*b* as sets of signals 205*a*, 205*b* to antenna terminal elements 216*a*-216*n*, wherein the first transmit output beam 224*a* and the second transmit output beam 224*b* may be transmitted from the AESA antenna device 200 as sets of signals 205*a*, 205*b*.

Figure 5:
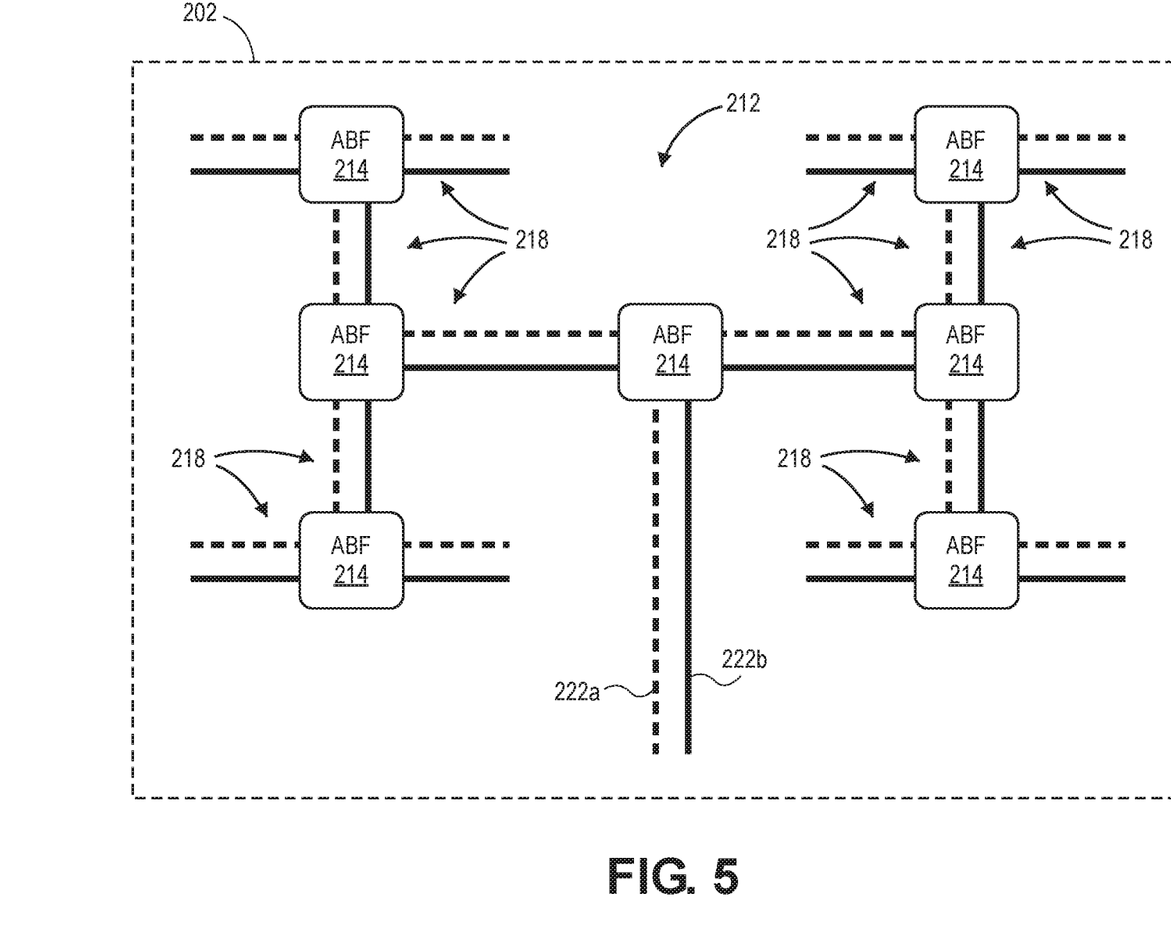
FIG. 5 illustrates a conceptual view beam forming network of an AESA antenna device, in accordance with one or more embodiments of the present disclosure.

FIG. 5 illustrates a conceptual view of a beam forming network 212 of an AESA antenna device 200, in accordance with one or more embodiments of the present disclosure. As noted previously herein, the beam forming network (BFN 212) may include a plurality of ABF integrated circuit devices 214*a*-214*n*. Each of the ABF integrated circuit devices 214*a*-214*n* may be configured to function as active splitters/combiners in order to route sets of signals 203, 205 throughout the AESA antenna device 200.

In embodiments, the BFN 212 disposed on the MCM 202 may be configured to operate for both narrowband arrays and wideband arrays. For example, it has been found that the BFN 212 topology is enabled for very broadband operation (e.g., 40 GHz) while simultaneously maintaining output match, gain, and noise figure (NF) to sufficient levels.

Figure 6:
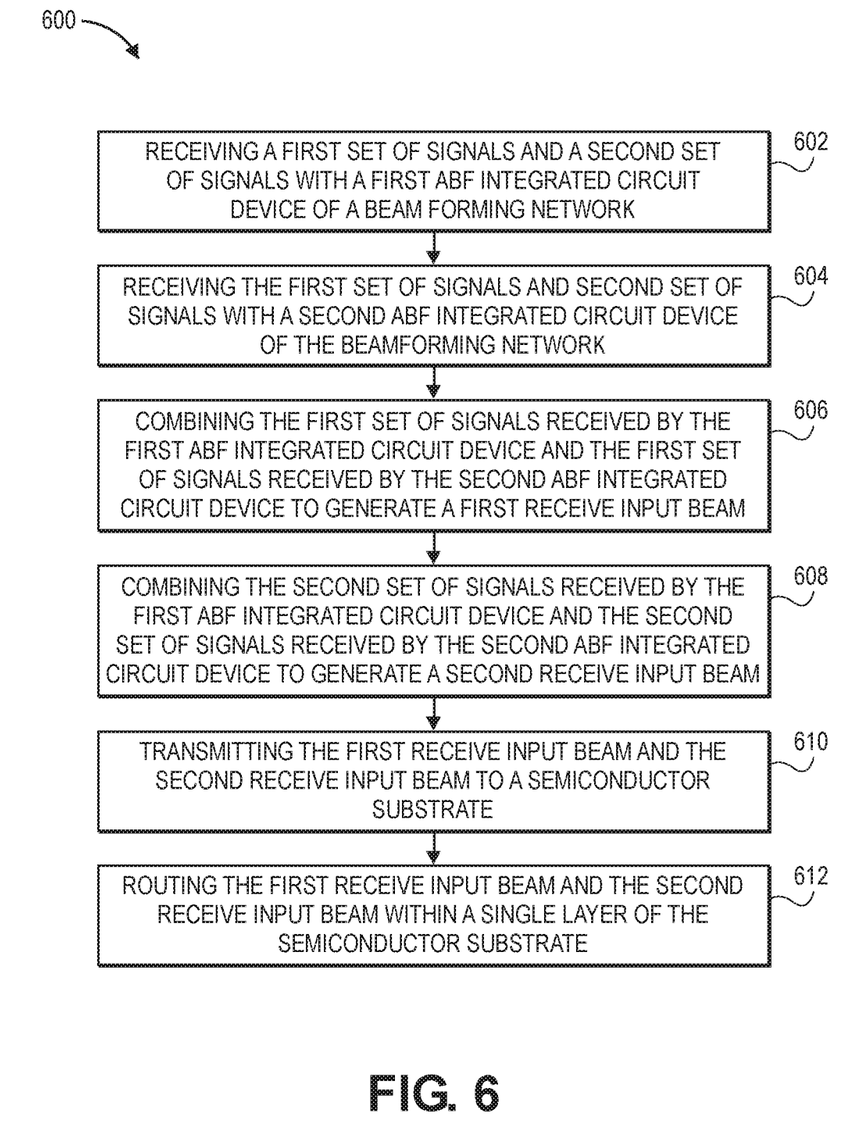
FIG. 6 illustrates a flowchart of a method for operating an AESA antenna device, in accordance with one or more embodiments of the present disclosure.

FIG. 6 illustrates a flowchart of a method 600 for operating an AESA antenna device 200, in accordance with one or more embodiments of the present disclosure. It is noted herein that the steps of method 600 may be implemented all or in part by AESA antenna device 200. It is further recognized, however, that the method 600 is not limited to the AESA antenna device 200 in that additional or alternative system-level embodiments may carry out all or part of the steps of method 600.

In a step 602, a first set of signals and a second set of signals are received with a first ABF integrated circuit device of a beam forming network. For example, referring to FIG. 4, a first ABF integrated circuit device 214*a* may be configured to receive a first set of signals 203*a* from a first transmitting device (e.g., first satellite), and a second set of signals 203*b* from a second transmitting device (e.g., second satellite) via the one or more antenna terminal elements 216*a*, 216*b*.

In a step 604, the first set of signals and the second set of signals are received with a second ABF integrated circuit device of the beamforming network. For example, the second ABF integrated circuit device 214*b* may further be configured to receive the first set of signals 203*a* from the first transmitting device (e.g., first satellite), and the second set of signals 203*b* from the second transmitting device (e.g., second satellite) via one or more antenna terminal elements 216 communicatively coupled to the second ABF integrated circuit device 214*b* (not shown).

In a step 606, the first set of signals received by the first ABF integrated circuit device and the first set of signals received by the second ABF integrated circuit device are combined to generate a first receive input beam. For example, the Nth ABF integrated circuit device 214n may be configured to generate a first receive input beam 222a, wherein the first receive input beam 222a may include the first set of signals 203a received via each respective antenna terminal element 216a-216n and combined throughout the BFN 212.

In a step 608, the second set of signals received by the first ABF integrated circuit device and the second set of signals received by the second ABF integrated circuit device are combined to generate a second receive input beam. For example, the Nth ABF integrated circuit device 214n may be configured to generate a second receive input beam 222b, wherein the second receive input beam 222b may include the second set of signals 203b received via each respective antenna terminal element 216a-216n and combined throughout the BFN 212.

In a step 610, the first receive input beam and the second receive input beam to are transmitted to a carrier substrate. For example, the first receive input beam 222a and the second receive input beam 222b may be transmitted to the carrier substrate 204 via the first electrical line 208a and the second electrical line 208b, respectively.

In a step 612, the first receive input beam and the second receive input beam are routed within a single layer of the carrier substrate. For example, as shown in FIG. 3, the first receive input beam 222a and the second receive input beam 222b may be routed within a first manifold layer 210a along the Beam 1 signal path 201a and the Beam 2 signal path 201b, respectively.

Although example embodiments of the present disclosure are shown and described in an aircraft environment, the inventive concepts of the present disclosure may be configured to operate in alternative and/or additional contexts, unless noted otherwise herein. For example, the embodiments of the present disclosure may be incorporated into the any air, land, or water-based vehicle (e.g., aircraft, automobiles, boats, ships, military vehicles). Thus, references to "aircraft," "airplanes," "avionics," and like terms should not be interpreted as a limitation on the present disclosure, unless noted otherwise herein.

It is further noted herein that, where the environment includes an aircraft environment, it is noted herein the embodiments of integrated circuit device 200 may be configured in accordance with avionics guidelines and/or standards put forth by, but not limited to, the Federal Aviation Administration (FAA), the European Aviation Safety Agency (EASA) or any other flight certification agency or organization; the American National Standards Institute (ANSI), Aeronautical Radio, Incorporated (ARINC), or any other standards setting organization or company; the Radio Technical Commission for Aeronautics (RTCA) or any other guidelines agency or organization; or the like.

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

What is claimed is:

1. An active electrically scanned array (AESA) antenna device, comprising:
   a beam forming network comprising a plurality of analog beamformer (ABF) integrated circuit devices, wherein the beam forming network is configured to:
   receive a first set of signals and a second set of signals with a first ABF integrated circuit device;
   receive the first set of signals and the second set of signals with a second ABF integrated circuit device;
   combine, with the second ABF integrated circuit device, the first set of signals received by the first ABF integrated circuit device and the first set of signals received by the second ABF integrated circuit device to generate a first receive input beam; and
   combine, with the second ABF integrated circuit device, the second set of signals received by the first ABF integrated circuit device and the second set of signals received by the second ABF integrated circuit device to generate a second receive input beam;
   combine a third set of signals received by one or more ABF integrated circuit devices of the plurality of ABF integrated circuit devices into a third receive input beam; and
   combine a fourth set of signals received by one or more ABF integrated circuit devices of the plurality of ABF integrated circuit devices into a fourth receive input beam; and
   a carrier substrate communicatively coupled to the beam forming network, the carrier substrate configured to:
   receive the first receive input beam with a first electrical line;
   receive the second receive input beam with a second electrical line; and
   route the first electrical line and the second electrical line within a first manifold layer of the carrier substrate, wherein the first set of signals comprise signals in the Ku-band, and wherein the second set of signals comprise signals in the Ka-band.

2. The AESA antenna device of claim 1, wherein the carrier substrate is further configured to:
   receive the third receive input beam with a third electrical line;
   receive the fourth receive input beam with a fourth electrical line; and
   route the third electrical line and the fourth electrical line within a second manifold layer of the carrier substrate different from the first manifold layer.

3. The AESA antenna device of claim 1, wherein at least one ABF integrated circuit device of the plurality of integrated circuit devices include an amplifier.

4. The AESA antenna device of claim 3, wherein the amplifier is configured to induce a phase shift in signals received by the at least one ABF integrated circuit.

5. The AESA antenna device of claim 1, wherein the beam forming network is further configured to induce a time delay into at least one of the first set of signals or the second set of signals.

6. The AESA antenna device of claim 1, wherein the first ABF integrated circuit device is communicatively coupled to one or more antenna terminal elements, wherein the one or more antenna terminal elements are configured to receive the first set of signals and the second set of signals.

7. The AESA antenna device of claim 1, wherein the beam forming network is disposed on a multi-chip module (MCM), wherein the MCM is disposed on a surface of the carrier substrate.

8. The AESA antenna device of claim 1, wherein the carrier substrate comprises a multi-layered printed circuit board (PCB).

9. The AESA device of claim 1, wherein each ABF integrated circuit device comprises at least one of a 2:1 active splitter/combiner or a 4:1 active splitter/combiner.

10. An active electrically scanned array (AESA) antenna device, comprising:
 a beam forming network comprising a plurality of analog beamformer (ABF) integrated circuit devices, wherein the beam forming network is configured to:
  receive a first set of signals and a second set of signals with a first ABF integrated circuit device;
  receive the first set of signals and the second set of signals with a second ABF integrated circuit device;
  combine, with the second ABF integrated circuit device, the first set of signals received by the first ABF integrated circuit device and the first set of signals received by the second ABF integrated circuit device to generate a first receive input beam; and
  combine, with the second ABF integrated circuit device, the second set of signals received by the first ABF integrated circuit device and the second set of signals received by the second ABF integrated circuit device to generate a second receive input beam;
  receive a transmit output beam from the carrier substrate with a third ABF integrated circuit device;
  split the transmit output beam with the third ABF integrated circuit device into a first set of transmit output signals and a second set of transmit output signals;
  transmit the first set of transmit output signals along a first branch to the first ABF integrated circuit device; and
  transmit the second set of transmit output signals along a second branch to the second ABF integrated circuit device; and
 a carrier substrate communicatively coupled to the beam forming network, the carrier substrate configured to:
  receive the first receive input beam with a first electrical line;
  receive the second receive input beam with a second electrical line; and
  route the first electrical line and the second electrical line within a first manifold layer of the carrier substrate, wherein the first set of signals comprise signals in the Ku-band, and wherein the second set of signals comprise signals in the Ka-band.

11. An active electrically scanned array (AESA) antenna device, comprising:
 a beam forming network comprising a plurality of analog beamformer (ABF) integrated circuit devices, wherein the beam forming network is configured to:
  receive a first set of signals and a second set of signals with a first ABF integrated circuit device;
  receive the first set of signals and the second set of signals with a second ABF integrated circuit device;
  combine, with the second ABF integrated circuit device, the first set of signals received by the first ABF integrated circuit device and the first set of signals received by the second ABF integrated circuit device to generate a first receive input beam; and
  combine, with the second ABF integrated circuit device, the second set of signals received by the first ABF integrated circuit device and the second set of signals received by the second ABF integrated circuit device to generate a second receive input beam; and
 a carrier substrate communicatively coupled to the beam forming network, the carrier substrate configured to:
  receive the first receive input beam with a first electrical line;
  receive the second receive input beam with a second electrical line; and
 route the first electrical line and the second electrical line within a first manifold layer of the carrier substrate, wherein the first set of signals comprise signals in the Ku-band, and wherein the second set of signals comprise signals in the Ka-band, wherein the first set of signals are received from a first transmitting device, and wherein the second set of signals are received from a second transmitting device different from the first transmitting device.

12. The AESA antenna device of claim 11, wherein the first transmitting device comprises a low Earth orbit (LEO) satellite, and the second satellite comprises a geosynchronous equatorial orbit (GEO) satellite.

13. The AESA antenna device of claim 11, wherein at least one ABF integrated circuit device of the plurality of integrated circuit devices include an amplifier.

14. The AESA antenna device of claim 13, wherein the amplifier is configured to induce a phase shift in signals received by the at least one ABF integrated circuit.

15. The AESA antenna device of claim 11, wherein the beam forming network is further configured to induce a time delay into at least one of the first set of signals or the second set of signals.

16. The AESA antenna device of claim 11, wherein the first ABF integrated circuit device is communicatively coupled to one or more antenna terminal elements, wherein the one or more antenna terminal elements are configured to receive the first set of signals and the second set of signals.

17. The AESA antenna device of claim 11, wherein the beam forming network is disposed on a multi-chip module (MCM), wherein the MCM is disposed on a surface of the carrier substrate.

18. The AESA antenna device of claim 11, wherein the carrier substrate comprises a multi-layered printed circuit board (PCB).

19. The AESA device of claim 11, wherein each ABF integrated circuit device comprises at least one of a 2:1 active splitter/combiner or a 4:1 active splitter/combiner.

* * * * *